United States Patent
Xhafa et al.

(10) Patent No.: US 10,560,909 B2
(45) Date of Patent: Feb. 11, 2020

(54) SIGNAL ANALYZER AND SYNCHRONIZER FOR NETWORKS

(71) Applicant: TEXAS INSTRUMENTS INCORPORATED, Dallas, TX (US)

(72) Inventors: Ariton E. Xhafa, Plano, TX (US); Jianwei Zhou, Allen, TX (US); Il Han Kim, Allen, TX (US); Kaichien Tsai, Allen, TX (US); Xiaolin Lu, Plano, TX (US)

(73) Assignee: TEXAS INSTRUMETNS INCORPORATED, Dallas, TX (US)

( * ) Notice: Subject to any disclaimer, the term of this patent is extended or adjusted under 35 U.S.C. 154(b) by 0 days.

(21) Appl. No.: 15/703,700

(22) Filed: Sep. 13, 2017

(65) Prior Publication Data
US 2018/0242266 A1    Aug. 23, 2018

Related U.S. Application Data

(60) Provisional application No. 62/460,592, filed on Feb. 17, 2017.

(51) Int. Cl.
*H04W 56/00* (2009.01)
*H04W 24/08* (2009.01)
*H04W 72/12* (2009.01)
*H04W 48/16* (2009.01)
*H04B 1/707* (2011.01)
*H04L 5/00* (2006.01)
*H04J 3/06* (2006.01)

(52) U.S. Cl.
CPC ......... *H04W 56/001* (2013.01); *H04W 24/08* (2013.01); *H04W 72/1263* (2013.01); *H04B 1/70718* (2013.01); *H04J 3/0652* (2013.01); *H04L 5/0005* (2013.01); *H04W 48/16* (2013.01)

(58) Field of Classification Search
CPC .................................................. H04W 56/001
USPC .......................................................... 370/350
See application file for complete search history.

(56) References Cited

U.S. PATENT DOCUMENTS

| | | | |
|---|---|---|---|
| 2004/0119639 A1* | 6/2004 | Gilkes ................... | G01S 19/256 342/357.52 |
| 2007/0258508 A1* | 11/2007 | Werb .................... | H04W 84/18 375/140 |

(Continued)

OTHER PUBLICATIONS

"Part 15.4: Low-Rate Wireless Personal Area Networks (LR-WPANs)," IEEE Standard for Local and metropolitan area networks, Amendment 1: MAC sublayer, 2012, 225 pages.

*Primary Examiner* — Shripal K Khajuria
(74) *Attorney, Agent, or Firm* — Ebby Abraham; Charles A. Brill; Frank D. Cimino

(57) ABSTRACT

A network includes a plurality of parent nodes to communicate in a wireless network via a wireless network protocol. A network node establishes a network connection to one of the parent nodes of the plurality of parent nodes in response to received beacons from the parent nodes. A signal analyzer in the network node processes a received signal strength of the beacons and the number of beacons received over a given time period from each of the parent nodes. The signal analyzer selects the parent node by analyzing the received signal strength for a number of beacons received from each parent node with respect to a number of expected beacons transmitted from each parent node of the plurality of parent nodes over the given time period.

13 Claims, 3 Drawing Sheets

(56) References Cited

U.S. PATENT DOCUMENTS

| | | | |
|---|---|---|---|
| 2013/0243038 A1* | 9/2013 | Rasband | H04W 8/005 375/133 |
| 2015/0029914 A1* | 1/2015 | Elliott | H04W 72/1278 370/311 |
| 2016/0072548 A1* | 3/2016 | Shih | H04B 1/7143 375/134 |
| 2016/0269971 A1* | 9/2016 | Kim | H04W 16/14 |
| 2018/0167955 A1* | 6/2018 | Prakash | H04W 72/10 |
| 2018/0175895 A1* | 6/2018 | Silverman | H04B 1/1036 |

* cited by examiner

SIGNAL ANALYZER AND SYNCHRONIZER FOR NETWORKS

CROSS-REFERENCE TO RELATED APPLICATION

This application claims the benefit of U.S. Provisional Patent Application 62/460,592 filed on 17 Feb. 2017, and entitled Systems and Methods for Robust Wireless Network Topology, the entirety of which is incorporated by reference herein.

TECHNICAL FIELD

This disclosure relates to networks, and more particularly to a network node that establishes a network connection with a selected parent node based on a number of beacons received and received signal strength for the beacons from the parent node.

BACKGROUND

Network time slotted protocols are widely used to establish communications between network nodes utilizing a predictable time frame slotting technique for nodes to communicate, where each network node communicates according to predefined time slots. Such protocols generally provide scheduled, contention-free channel access to improve throughput performance compared to carrier sense techniques. These protocols are often employed in the formation of ad hoc wireless communications networks, for example. Ad hoc wireless communications networks are formed dynamically as nodes come within range of existing network resources. These networks may be utilized in many applications to provide communications between lower level devices on the networks such as sensors and upper tier devices communicating with the sensors.

In some applications, routing protocols are created that define relationships in the network and how the network operates as conditions change. For example, each node within the network can have a preferred parent node for communications in an upwards direction and possibly having multiple intermediate nodes and/or child nodes for downward communications.

A multi-hop wireless network consists of a root node, intermediate nodes, and child nodes which are also referred to as leaf nodes. The root node connects the network to an internal or external network. The intermediate node connects the leaf nodes (and other intermediate nodes) to the root node and from there to the internal/external network. The definition of leaf/child nodes is that there are no other nodes connected to these nodes. In beacon channel hopping networks, a coordinator transmits periodic beacons that contain information to facilitate nodes joining and communicating in the network. The information contained in the beacon could be the channels to be used at a specific time, timing information when this beacon is sent, link information, and so forth. To transmit data in these networks, the nodes can then use the link information, which can be a pair of (channel, time) to communicate and send data to their respective neighbors. In order to use the link information, nodes are to be synchronized and receive beacons. Intermediate nodes also transmit beacons and in these beacons, the same information that was sent by the coordinator is repeated. This is to allow other intermediate and leaf/child nodes to connect to the network.

SUMMARY

This disclosure relates to a network node that establishes a network connection with a selected parent node based on a number of beacons received and received signal strength for the beacons from the parent node. In one example, a network includes a plurality of parent nodes that communicates in a wireless network via a wireless network protocol. The parent nodes transmit beacons in the wireless network to facilitate establishing network communications with the parent nodes. A network node establishes a network connection to one of the parent nodes of the plurality of parent nodes based on the beacons received from the parent nodes. A signal analyzer in the network node processes a received signal strength of the beacons and the number of beacons received over a given time period from each of the parent nodes. The signal analyzer selects the parent node from the plurality of nodes by analyzing the received signal strength for a number of beacons received from each parent node of the plurality of parent nodes with respect to a number of expected beacons transmitted from each parent node of the plurality of parent nodes over the given time period. The network node establishes the network connection with one of the parent nodes of the plurality of parent nodes based on the selection by the signal analyzer.

In another example, a network includes a plurality of parent nodes that communicates in a wireless network via a wireless network protocol. The parent nodes transmit beacons in the wireless network to facilitate establishing network communications with the parent nodes. A network node establishes a network connection to one of the parent nodes of the plurality of parent nodes based on the beacons received from the parent nodes. A signal analyzer in the network node processes a received signal strength of the beacons and the number of beacons received over a given time period from each of the parent nodes. The signal analyzer selects the parent node from the plurality of nodes by analyzing the received signal strength for a number of beacons received from each parent node of the plurality of parent nodes with respect to a number of expected beacons transmitted from each parent node of the plurality of parent nodes over the given time period. The network node establishes the network connection with one of the parent nodes of the plurality of parent nodes based on the selection by the signal analyzer. A synchronizer initiates a synchronization request from the network node to the selected parent node based on a number of keep alive frames sent and not acknowledged by the selected parent by the network node and a number of expected beacons not received by the network node.

In yet another example, a method includes transmitting beacons in a wireless network to facilitate establishing network communications with a plurality of parent nodes. The method includes analyzing a received signal strength for a number of beacons received from each parent node of the plurality of parent nodes with respect to a number of expected beacons transmitted from each parent node of the plurality of parent nodes over the given time period. The method includes establishing a network connection between a network node and one of the parent nodes of the plurality of parent nodes based on analyzing the received signal strength and the number of beacons received from each parent node of the plurality of parent nodes over the given time period.

DETAILED DESCRIPTION

This disclosure relates to a network node that establishes a network connection with a selected parent node based on a number of beacons received and received signal strength for the beacons from the parent node. The network node includes a signal analyzer to select a given parent node from a plurality of candidate parent nodes based on an analysis of a received signal strength parameter (RSSI) which indicates the quality of a given communications link and with respect to a number of expected beacons to be received over a given time period from each parent node. In one example where average RSSI values are kept by the node, a modified RSSI is determined by computing the average RSSI multiplied by a number of received beacons and divided by the number of expected beacons over the given time period. The modified RSSI (e.g., modified RSSI computed having the largest value from the plurality of parent nodes) is used to then select which parent from the plurality of nodes to establish a network connection. In another example where the node tracks individual RSSI values from each parent node, the modified RSSI can be computed as the sum of all individual RSSI values received and then divided by the number of expected beacons over the given time period. After the node establishes a network connection based on the modified RSSI value, a synchronizer can keep the network node synchronized in an efficient manner by analyzing a number of keep alive frames lost and beacons lost with respect to given thresholds to determine whether to initiate a synchronization request.

Figure 1:
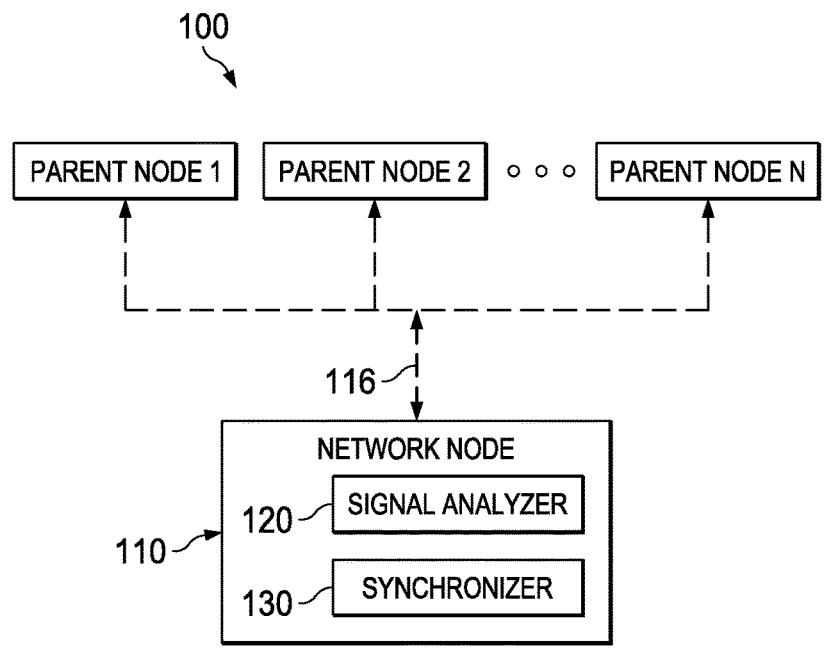
FIG. 1 illustrates an example network where a network node establishes a network connection with a selected parent node based on a number of beacons received and received signal strength for the beacons from the parent node.

FIG. 1 illustrates an example network 100 where a network node 110 establishes a network connection based on a number of beacons received and received signal strength for the beacons from the parent node. The network 100 includes a plurality of parent nodes shown as nodes that communicate across wireless network signals 116 via a wireless network protocol. The parent nodes transmit beacons in across the wireless network signals 116 to facilitate establishing network communications with the parent nodes. The network node 110 establishes a network connection to one of the parent nodes of the plurality of parent nodes 1-N based on the beacons received from the parent nodes. A signal analyzer 120 in the network node 110 processes a received signal strength of the beacons and the number of beacons received over a given time period from each of the parent nodes 1-N. The signal analyzer 120 selects the parent node from the plurality of nodes by analyzing the received signal strength for a number of beacons received from each parent node of the plurality of parent nodes with respect to a number of expected beacons transmitted from each parent node of the plurality of parent nodes over the given time period. As used herein the term number of beacons receives represents the actual number of beacons received in a given time period by the network node 110. The term expected beacons transmitted refers to the number of beacons that were expected based on regular network activity yet may be less than the actual number of beacons received due to noise or other communications problems such as weak signal strength. The network node 110 establishes the network connection with one of the parent nodes 1-N of the plurality of parent nodes based on the selection by the signal analyzer 120.

After establishing a connection, the network node 110 includes a synchronizer 130 that facilitates time synchronization with the selected parent node 1-N (e.g., exchanging timing correction information, status, and/or control data allowing synchronization to proceed). As used herein, the term "time synchronization" refers to sharing timing information between nodes that enables one node to correct its timing relative to timing implemented at another node. Since each node computes its own timing for the beginning of a slot frame, the time when the start of the slot frame that each node is assigned a slot time can differ due to clock inaccuracies, drift, and so forth. Timing between nodes can drift for many reasons including temperature variations, component tolerances, and the fact that the respective nodes in many cases do not generally power up at the same time. Timing adjustments are typically specified with reference to the beginning of a slot frame such as illustrated and described herein with respect to FIG. 2. In this example, the parent node 1-N can be a root node or an intermediate node whereas the network node 110 can be an intermediate node or a child/leaf node. The wireless network protocol described herein can be any time division multiple access protocol (TDMA), such as a time slotted channel hopping (TSCH) protocol specified according to IEEE 801.15.4e, for example.

In one example, the signal analyzer 120 selects the parent node from the plurality of nodes 1-N by computing the received signal strength for a number of beacons received from each parent node of the plurality of parent nodes and dividing by a number of expected beacons transmitted from each parent node of the plurality of parent nodes over the given time period. In another example, the signal analyzer 120 selects the parent node from the plurality of nodes 1-N by computing a first modified received signal strength indicator (ModRSSI_1), the ModRSSI_1 equals an average received signal strength indicator (avgRSSI) for a number of beacons received from each parent node of the plurality of parent nodes multiplied by a number of beacons received (nrBeaconsReceived) from each parent node of the plurality of parent nodes and then dividing by a number of expected beacons transmitted (nrExpectedBeacons) from each parent node of the plurality of parent nodes over the given time period.

If average RSSI values are not maintained by the network node 120 but instead individual RSSI values, the signal analyzer 120 selects the parent node from the plurality of nodes by computing a second modified received signal strength indicator (ModRSSI_2). The ModRSSI_2 equals adding the received signal strength for a number of beacons received (RSSI1+RSSI2+RSSIM, where M is a positive integer) from each parent node of the plurality of parent nodes 1-N and dividing by a number of expected beacons transmitted (nrExpectedBeacons) from each parent node of the plurality of parent nodes over the given time period. The network node 110 includes the synchronizer 130 to initiate a synchronization request from the network node to the selected parent node based on a number of keep alive frames sent to and not acknowledged by the selected parent by the network node and a number of expected beacons not received by the network node. As used herein, keep alive frames refer to data packets that are sent between network node and parent to maintain synchronization. In one example, the synchronizer 130 determines if a synchronization request from the network node should be sent to the selected parent node by comparing the number of keep alive frames not acknowledged to a keep alive threshold and comparing a number of lost consecutive beacons to a beacon threshold. The synchronization request is then sent to the selected parent by the network node 110 if each of the keep alive threshold and the beacon threshold has been exceeded.

Figure 2:
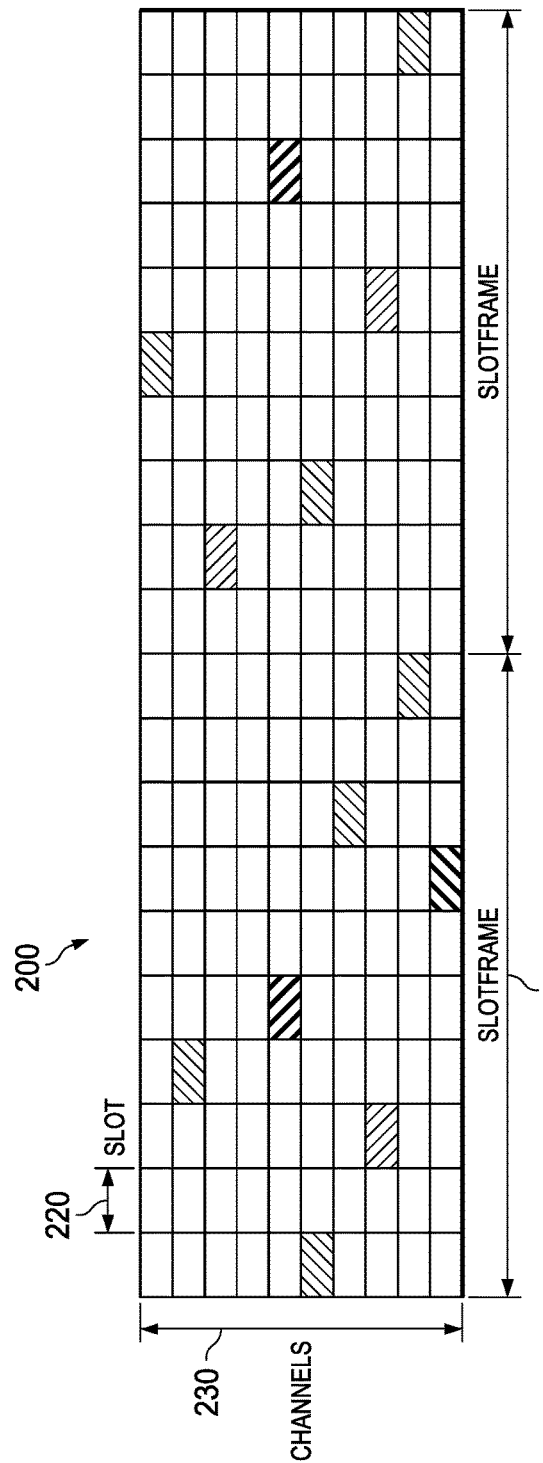
FIG. 2 illustrates an example of a network protocol for node beacon processing and time synchronization that utilizes channels, slot frames and time slots.

FIG. 2 illustrates an example of a network protocol diagram 200 for node beacon processing and time synchronization that utilizes channels, slot frames and time slots. As used herein, the term "time slot" refers to a designated period of time in a communications frame where a given node can receive and/or transmit data, where a frame is a basic unit of data transport that includes a set of contiguous time-slots transmitted according to a schedule that repeats over time. Some time slots in the frame are reserved for beacon communications and some time slots are shared meaning that any node can transmit data during a shared time slot. Shared time slots are also referred to as contention slots since multiple nodes can conflict with each other if each node transmits data during the shared slot. Other time slots are specifically reserved as receive time slots and transmit time slots for each respective node. As described herein, in some examples, child nodes can be assigned a lower slot number in the slot frame to allow the child node to synchronize to the intermediate node before the intermediate node synchronizes to its respective parent node.

The diagram 200 illustrates the mode of operation for a time slotted channel hopping (TSCH) media access control (MAC) although other protocols are possible. Time consists of a slot frame 210, where each slot frame consists of timeslots (or slots) 220. The communication between the nodes in the network occurs during the timeslots 220, although, it can happen across the same or different channels shown at 230. The channels are utilized to account for modulo differences between frames. For example, if a child node communicates on slot two in frame one of a ten slot frame, in the next frame it would communicate on the second slot of the fame which would be twelve slots from the beginning of the first frame. Thus, in the second frame, the child node could communicate on channel three during the second time slot of frame two. For example, if node A and node B are assigned slot 3 in slot frame 1, the channel that they are communicating in this slot frame is channel 3. However, in slot frame 2, the timeslot number is the same; however, the channel number is 5 this time. As noted above, each node computes its own start time for the beginning of the slot frame and where it expects each nodes corresponding slot time in the frame to occur. When nodes are out of time synchronization, the computed time by each node for the beginning of the slot frame 210 differs between nodes. The timing correction information described herein can be exchanged (e.g., sent from parent node to child node) or computed (e.g., network node computes base on response in an acknowledgement packet and timing of a received beacon or data frame from the parent node).

Figure 3:
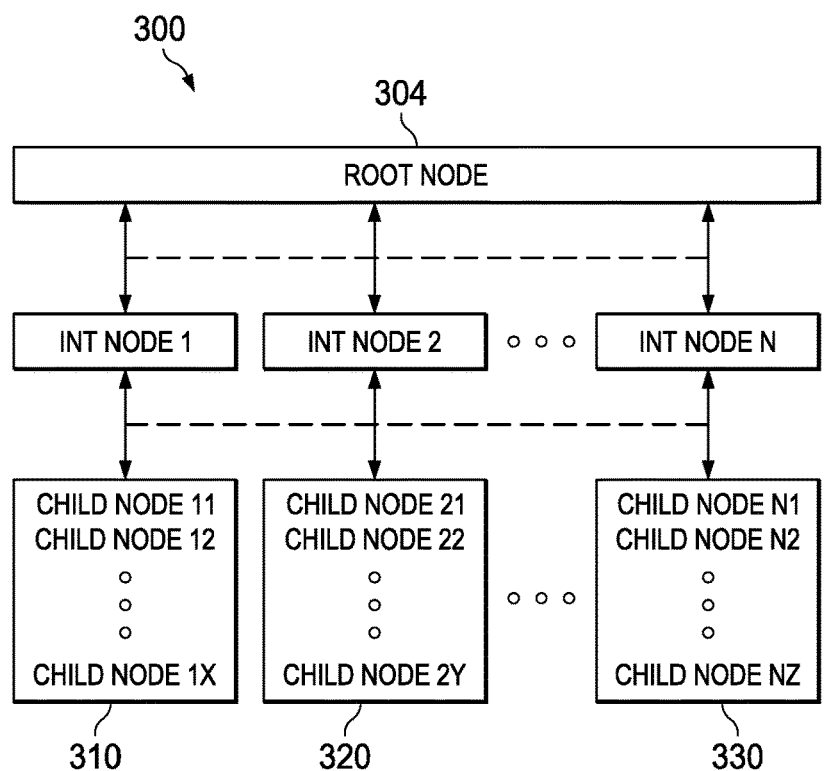
FIG. 3 illustrates an example network configuration having multiple intermediate and child nodes that can periodically exchange beacon and timing information.

FIG. 3 illustrates an example network configuration 300 having multiple intermediate and child nodes that can exchange beacon and timing information. Each of the intermediate and child nodes shown in the network configuration 300 can include respective signal analyzers and synchronizers as described herein. A top level in the network 300 can include a root node 304 which serves as a parent node to one or more intermediate nodes shown as INT NODE 1 through INT NODE N, where N is a positive integer. Thus, each of the intermediate nodes can be viewed as a child node of the parent nodes. In turn, each of the intermediate nodes 1 though N can have one or more child nodes attached thereto. For example, at 310, child nodes 11 through 1X can report to intermediate node 1 operating as a parent node, where X is a positive integer. At 320, child nodes 21 through 2Y can report to intermediate node 2 operating as a parent node, where Y is a positive integer. At 330, child nodes N1 through NZ can report to intermediate node N operating as a parent node, where Z is a positive integer.

A dashed line is shown between nodes at the intermediate level and another dashed line is shown between nodes at the child level, where each dashed line represents that some nodes may be able to communicate between other members at a common hierarchy level and some nodes may not be able to communicate at the common level. In some network examples, intermediate nodes and/or child nodes may communicate with other nodes at their respective hierarchy levels depending on network topologies and network device locations. In other examples, communications can be routed to and/or from the respective child nodes, through the intermediate nodes, to the root node 304 in order to route messages from one node in the network to another node in the network that is not in the same linear path as the respective root node, intermediate node, and child node. In some examples, the node hierarchy can depend on the physical location and proximity among the nodes in the network (e.g., a centrally located node being a root or intermediate node and edge nodes being child nodes). Additionally or alternatively, node hierarchy can be determined according to the temporal order in which nodes are added to the network (e.g., first node being a root node and last added node being a child node).

The network 300 can be provided as a multi-hop wireless network that consists of the root node 304, intermediate nodes, and child nodes. The root node 304 connects the network to an internal or external network. The intermediate nodes connect the child nodes (and other intermediate nodes) to the root node and from there via the root node to the internal/external network. The definition of child nodes, in this example, is that there are no other nodes connected to these nodes. To transmit data in these networks, the nodes can then use the link information, which can be communication parameters (e.g., specified channel and network time), to communicate and send data to their neighboring nodes. In order to use the link information are to be synchronized and receive beacons. Intermediate nodes also transmit beacons and in these beacons, the same information that was sent by the coordinator is repeated. This is to allow other intermediate and child nodes to connect to and communicate within the network.

Figure 4:
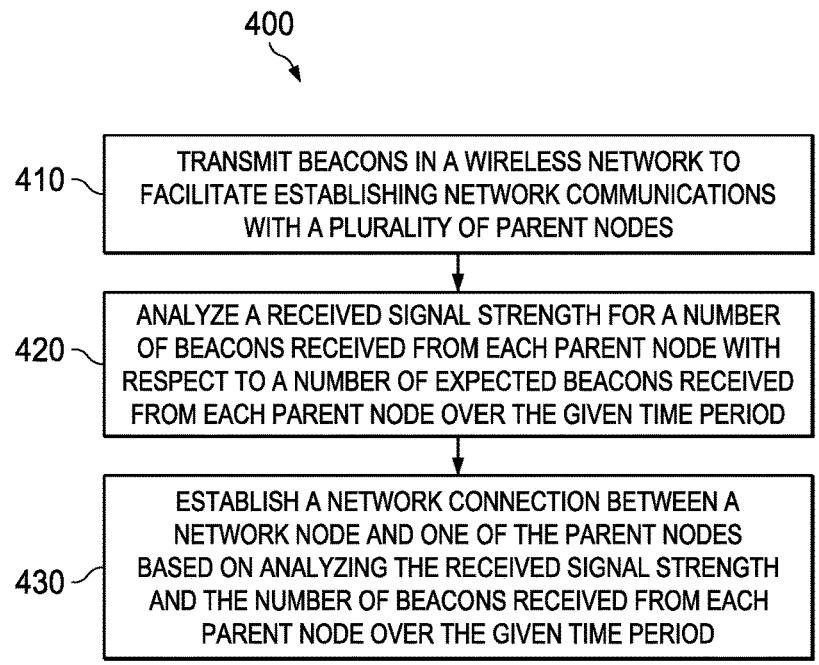
FIG. 4 illustrates an example method where a network node establishes a network connection with a selected parent node based on a number of beacons received and received signal strength for the beacons from the parent node.

In view of the foregoing structural and functional features described above, an example method will be better appreciated with reference to FIG. 4. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured as machine readable instructions stored in memory and executable in an IC or a processor, for example.

FIG. 4 illustrates an example method 400 where a network node establishes a network connection with a selected parent node based on a number of beacons received and received signal strength for the beacons from the parent node. At 410, the method 400 includes transmitting beacons in a wireless network to facilitate establishing network communications with a plurality of parent nodes (e.g., via parent nodes 1-N of FIG. 1). At 420, the method 400 includes analyzing a received signal strength for a number of beacons received from each parent node of the plurality of parent nodes with respect to a number of expected beacons transmitted from each parent node of the plurality of parent nodes over the given time period (e.g., via signal analyzer 120 of FIG. 1). At 430, the method 400 includes establishing a network connection between a network node and one of the parent nodes of the plurality of parent nodes based on analyzing the received signal strength and the number of beacons received from each parent node of the plurality of parent nodes over the given time period (e.g., via network node 110 of FIG. 1).

Although not shown, the method 400 can include determining if a synchronization request from the network node should be sent to the parent node by comparing a number of keep alive frames not acknowledged to a keep alive threshold and comparing a number of lost consecutive beacons to a beacon threshold (e.g., via synchronizer 130 of FIG. 1). The synchronization request is sent to the parent node by the network node if each of the keep alive threshold and the beacon threshold has been exceeded. The method 400 can include selecting the parent node from the plurality of nodes by computing the received signal strength for a number of beacons received from each parent node of the plurality of parent nodes and dividing by a number of expected beacons transmitted from each parent node of the plurality of parent nodes over the given time period.

The method 400 can include selecting the parent node from the plurality of nodes by computing a first modified received signal strength indicator (ModRSSI_1), the ModRSSI_1 equals an average received signal strength indicator (avgRSSI) for a number of beacons received from each parent node of the plurality of parent nodes multiplied by a number of beacons received (nrBeaconsReceived) from each parent node of the plurality of parent nodes and dividing by a number of expected beacons transmitted (nrExpectedBeacons) from each parent node of the plurality of parent nodes over the given time period. In another example, the method 400 can include selecting the parent node from the plurality of nodes by computing a second modified received signal strength indicator (ModRSSI_2), the ModRSSI_2 equals adding the received signal strength for a number of beacons received (RSSI1+RSSI2+RSSIM, where M is a positive integer) from each parent node of the plurality of parent nodes and dividing by a number of expected beacons transmitted (nrExpectedBeacons) from each parent node of the plurality of parent nodes over the given time period.

Figure 5:
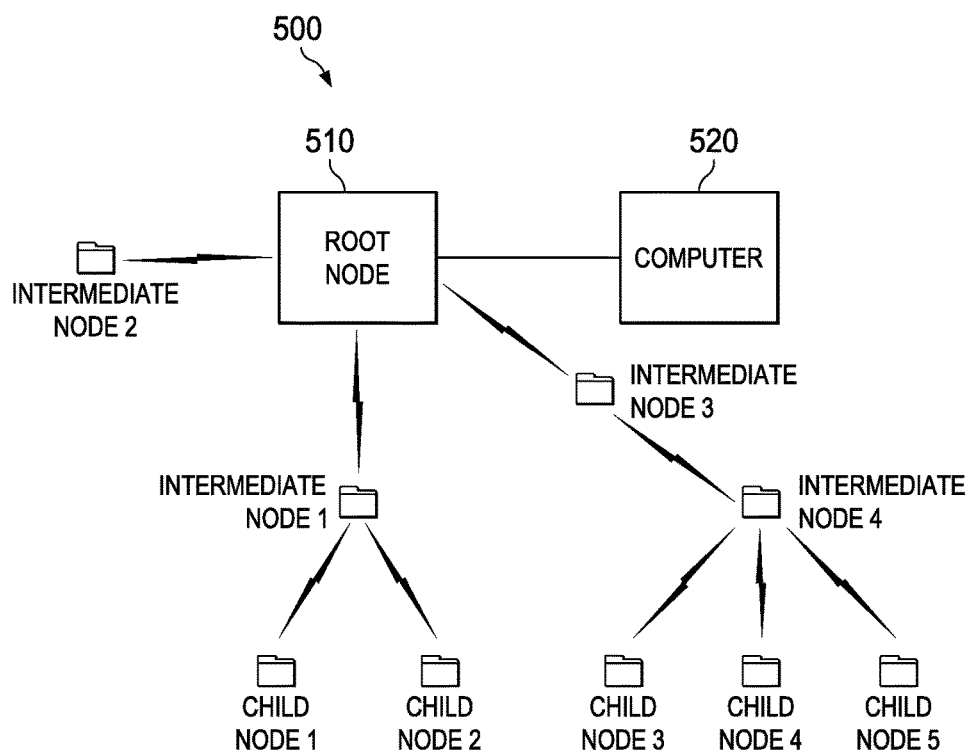
FIG. 5 illustrates an example system where a network node establishes a network connection with a selected parent node based on a number of beacons received and received signal strength for the beacons from the parent node.

FIG. 5 illustrates an example system 500 where a network node establishes a network connection with a selected parent node based on a number of beacons received and received signal strength for the beacons from the parent node. As shown, the system 500 can include a root node 510 that can be configured via a network computer 520 (e.g., laptop, cell phone). The root node 510 communicates directly to three intermediate nodes 1 through 3 and indirectly with intermediate node 4 via node 3. Child nodes 1 and 2 communicate via intermediate node 1, whereas child nodes 3 through 5 communicate via intermediate node 4. The child nodes can execute the signal analyzer and synchronizers previously described.

In previous systems, before the network node joins the network, it scans for beacons. It creates a list of candidate set of parents and selects the one based on a pre-defined criteria. In one example, the first criterion is referred to as joint priority. This information is transmitted in the beacon and it indicates the number of hops that the node is away from the root node. Other prior methods consider a received signal strength indicator (RSSI) threshold, before adding the node transmitting the beacon in the candidate list. When the scanning period completes, joint priority is used to select the default parent and if the joint priorities for two nodes in the candidate set are the same, then average (or instantaneous) RSSI is used next as the tiebreaker. However, this prior approach to selecting a parent allows a network node to select a parent that is further away, even though the communication is poor.

The signal analyzer described herein uses a modified RSSI to decide on the default parent node. The modified RSSI operates as follows:

For each candidate parent, the network node records the RSSI of the received beacons and also keeps track of the received beacons for the scanning period.

At the end of the scanning period, the following modified RSSI is calculated:

If the node keeps average RSSI only value (to reduce memory requirements), then compute:

$$ModRSSI = avgRSSI * nrBeaconsReceived / nrExpectedBeacons$$

If the node keeps individual RSSI values, then compute:

$$ModRSSI = (RSSI1 + RSSI2 + \ldots) / nrExpectedBeacons$$

This method penalizes the parent nodes that result in less number of received beacons than expected during the scan interval. Thus, the parent selection criterion is not only the RSSI but also the number of received beacons. When the node selects its parent, then maintaining the connection can be enhanced via the synchronizer described herein.

In TSCH networks, keep alive frames are used as the primary approach to maintain synchronization. The manner in which this approach operates is as follows: The network node wanting to synchronize with its parent sends a keep alive frame to its parent. Upon reception of the frame, the parent replies with an acknowledgment frame that also contains time drift information for the node. Upon reception of the acknowledgment frame, the network node uses the timing information to correct its time. A problem can arise when the network node does not receive an acknowledgement for consecutive transmitted keep alive frames. At this time, the network node could trigger a resynchronization procedure. A higher number of resynchronization attempts may be observed, even though the network node would still be synchronized. To mitigate this condition, a combination of both, lost consecutive acknowledgement frames for keep alive frames and lost number of consecutive beacons can be processed. Thus, the condition would become: If(lostKeepAliveFrames>keepAliveThreshold && lostConsecutiveBeacons>beaconThreshold), then trigger a synchronization request. This method has been shown to reduce unnecessary resynchronization procedures that for low power devices that may be of concern. In addition, less synchronization procedures also results in more robust network topology.

Figure 6:
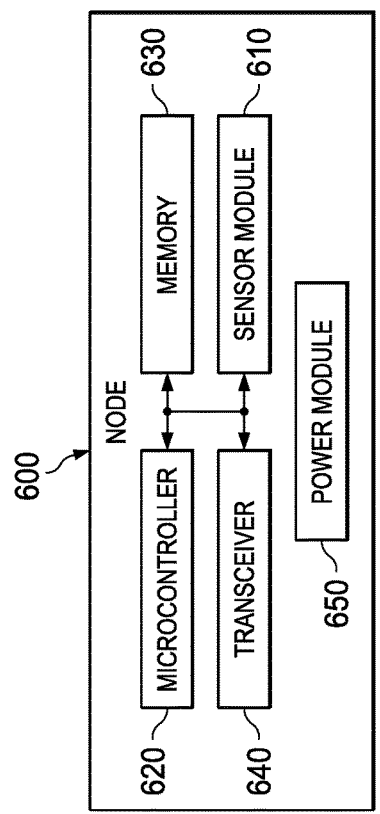
FIG. 6 illustrates an example node that can be employed in a network where a network node establishes a network connection with a selected parent node based on a number of beacons received and received signal strength for the beacons from the parent node.

FIG. 6 illustrates an example node 600 that can be employed in a network where a network node establishes a network connection with a selected parent node based on a number of beacons received and received signal strength for the beacons from the parent node. The example node 600 can be employed as part of a wireless sensor network (WSN) or system that contains a plurality (even hundreds of thousands) of sensor nodes. Such network/system examples where the node 600 can be implemented are shown with respect to FIGS. 1 and 3. Each node 600 can be equipped with a sensor module 610 to detect physical phenomena such as light, heat, pressure, and so forth. The sensor nodes in the WSN can communicate among themselves via radio signals utilizing substantially any wireless protocol such as Bluetooth, Bluetooth Low energy (BLE), WIFI, IEEE 802.11, and Worldwide Interoperability for Microwave Access (WiMAX) protocol, for example. The individual nodes in the WSN are inherently resource constrained, thus they tend to be limited in processing speed, storage capacity, and communication bandwidth. After the sensor nodes are deployed, they are responsible for self-organizing an appropriate network infrastructure often with multi-hop communication with them. The working mode of the sensor nodes may be either continuous or event driven for example.

Wireless sensor networks are spatially distributed autonomous sensors to monitor physical or environmental conditions, such as temperature, sound, pressure, and so forth and to cooperatively pass their data through the network to a main location. The more modern networks are bi-directional, also enabling control of sensor activity. The WSN is built of "nodes," where each node 600 is connected to one (or sometimes several) sensors. The WSN's can include ad-hoc networks where nodes can connect and leave the network dynamically. The node 600 generally includes a microcontroller 620, memory 630 (e.g., ferroelectric random access memory (FRAM)), wireless transceiver 640 (e.g., Texas Instrument CC2500 2.4 GHz RF transceiver), power module 650 (e.g., Texas Instrument BQ25504), along with the sensor module 610 (e.g., temperature detector, infrared detector, input/output module, analog conversion module). Intermediate nodes and child nodes generally share the same hardware and software but change their status (intermediate/child) depending if they are configured per a given communications layer operating with the node memory 630 and/or transceiver 640 such as a routing layer or a network layer, for example. A root node may have one additional level of capability over the intermediate/child nodes which is the ability to connect to other larger/broader networks such as the Internet.

Size and cost constraints on sensor nodes result in corresponding constraints on resources such as energy, memory, computational speed, and communications bandwidth. The topology of the WSNs can vary from a simple star network to an advanced multi-hop wireless mesh network. The propagation technique between the hops of the network can be routing or flooding. Software is typically reduced in complexity to conserve power on respective sensor nodes. Examples of node operating software systems can include TI-RTOS, TinyOS, LiteOS, and Contiki, for example. Other sensor nodes may operate as embedded systems without the use of a given operating system. The node synchronization capabilities described herein can be executed by the microcontroller 620 as executable instructions operating within the memory 630. In an alternative example, the microcontroller 620, memory, transceiver 640, and/or sensor module 610, can be implemented as an application specific integrated circuit.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A network, comprising:
   a first parent device and a second parent device, wherein the first and second parent devices are configured to transmit respective beacons in a wireless network; and
   a network device including a signal analyzer, the network device configured to establish a network connection to either the first parent device or the second parent device based on the beacons received from the first and second parent devices; and
   the signal analyzer in the network device configured to:
      process a received signal strength of the beacons and the number of beacons received over a given time period from the first and second parent devices;
      select either the first or second parent device based in part on determining the received signal strength of the beacons received from the first and second parent devices and comparing the number of beacons received to a number of expected beacons from the first and second parent devices over the given time period,
   wherein the network device is further configured to establish the network connection with the selected parent device.

2. The network of claim 1, wherein the network protocol is a time slotted channel hopping (TSCH) protocol.

3. The network of claim 1, wherein the signal analyzer selects either the first or second parent device by computing the received signal strength for a number of beacons received from the first parent device and dividing by a number of expected beacons transmitted from the first parent device over the given time period.

4. The network of claim 1, wherein the signal analyzer selects either the first or second parent device by computing a first modified received signal strength indicator (ModRSSI_1), the ModRSSI_1 equals an average received signal strength indicator (avgRSSI) for a number of beacons received from the first parent device multiplied by a number of beacons received (nrBeaconsReceived) from the first parent device and dividing by a number of expected beacons transmitted (nrExpectedBeacons) from the first parent device over the given time period.

5. The network of claim 1, wherein the signal analyzer selects either the first or second parent device by computing a second modified received signal strength indicator (ModRSSI_2), the ModRSSI_2 equals adding the received signal strength for a number of beacons received (RSSI1+RSSI2+RSSIM, where M is a positive integer) from the first parent device and dividing by a number of expected beacons transmitted (nrExpectedBeacons) from the first parent device over the given time period.

6. The network of claim 1, wherein the network device includes a synchronizer to initiate a synchronization request from the network device to the selected parent device based on a number of keep alive frames sent to and not acknowledged by the selected parent by the network device and a number of expected beacons not received by the network device.

7. The network of claim 6, wherein the synchronizer determines if a synchronization request from the network device should be sent to the selected parent device by comparing the number of keep alive frames not acknowledged to a keep alive threshold and comparing a number of lost consecutive beacons to a beacon threshold, the synchronization request is sent to the selected parent by the network device if each of the keep alive threshold and the beacon threshold has been exceeded.

8. The network of claim 1, wherein the parent device is a root device or an intermediate device and the network device is an intermediate device or a child device.

9. A method, comprising:
receiving beacons in a wireless network from a first parent device and a second parent device;
selecting either the first parent device or the second parent device based in part on determining a received signal strength of the beacons received from the first and second parent devices and comparing a number of beacons received from the first and second parent devices to a number of expected beacons from the first and second parent devices over the given time period; and
establishing a network connection between a network device and the selected parent device.

10. The method of claim 9, further comprising determining if a synchronization request from the network device should be sent to the selected parent device by comparing a number of keep alive frames not acknowledged to a keep alive threshold and comparing a number of lost consecutive beacons to a beacon threshold, the synchronization request is sent to the selected parent device by the network device if each of the keep alive threshold and the beacon threshold has been exceeded.

11. The method of claim 9, further comprising selecting the parent device from the plurality of devices by computing the received signal strength for a number of beacons received from the first parent device and dividing by a number of expected beacons transmitted from the first parent device over the given time period.

12. The method of claim 9, further comprising selecting either the first and second parent device by computing a first modified received signal strength indicator (ModRSSI_1), the ModRSSI_1 equals an average received signal strength indicator (avgRSSI) for a number of beacons received from the first parent device multiplied by a number of beacons received (nrBeaconsReceived) from the first parent device and dividing by a number of expected beacons transmitted (nrExpectedBeacons) from the first parent device over the given time period.

13. The method of claim 9, further comprising selecting either the first or second parent device by computing a second modified received signal strength indicator (ModRSSI_2), the ModRSSI_2 equals adding the received signal strength for a number of beacons received (RSSI1+RSSI2+RSSIM, where M is a positive integer) from the first parent device and dividing by a number of expected beacons transmitted (nrExpectedBeacons) from each parent device of the plurality of parent devices over the given time period.

* * * * *